United States Patent [19]

Mori et al.

[11] 4,329,011

[45] May 11, 1982

[54] METHOD FOR DRIVING A LIGHT SCANNING APPARATUS

[75] Inventors: Masafumi Mori, Mountain View, Calif.; Tutomu Saito, Yokohama, Japan

[73] Assignee: Tokyo Shibaura Denki Kabushiki Kaisha, Kawasaki, Japan

[21] Appl. No.: 95,502

[22] Filed: Nov. 19, 1979

[51] Int. Cl.³ .............................................. G02B 27/17
[52] U.S. Cl. ................................................... 350/6.6
[58] Field of Search ................ 350/6.6, 6.8; 250/202; 358/199; 179/100.3 H

[56] References Cited

U.S. PATENT DOCUMENTS 4,178,064 12/1979 Mrdjen .................... 350/6.6

OTHER PUBLICATIONS

Berg et al., High-Resolution Graphics Using a HeCd Laser to Write on Kalvar Film, Jul. 1974, vol. 83, Journal of the SMPTE, pp. 558–599.

*Primary Examiner*—John K. Corbin
*Assistant Examiner*—Rebecca D. Gass
*Attorney, Agent, or Firm*—Oblon, Fisher, Spivak, McClelland & Maier

[57] ABSTRACT

A method for driving a light scanning apparatus having a drive means which drive a scanning unit in accordance with input signals. The cycle of scanning is divided into a plurality of periods. Drive signals of different levels are supplied to the drive means during said periods, respectively.

12 Claims, 15 Drawing Figures

FIG. 3
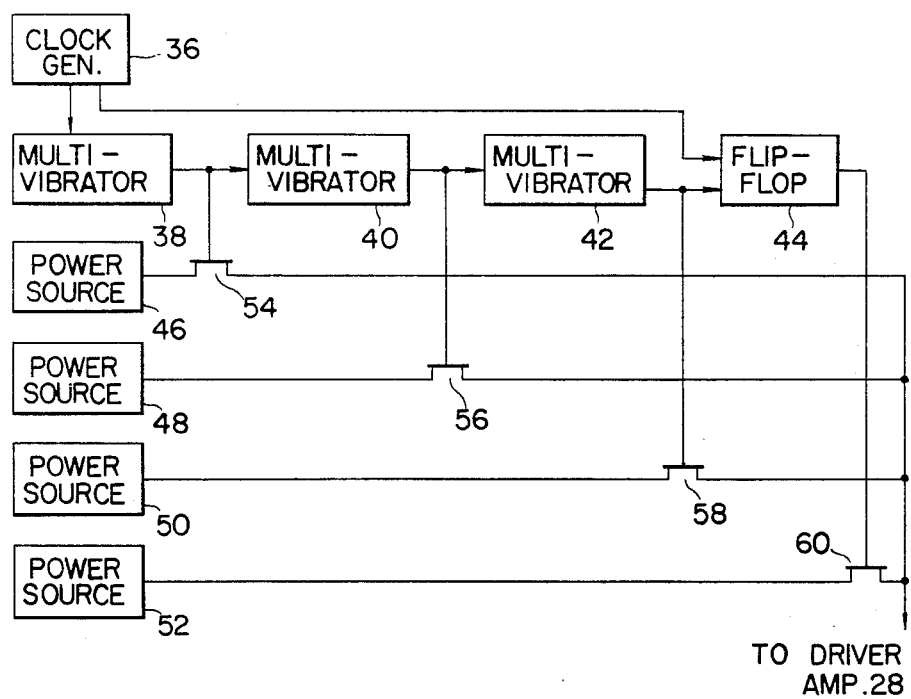
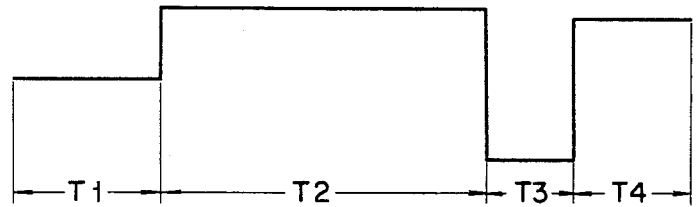
FIG. 4A
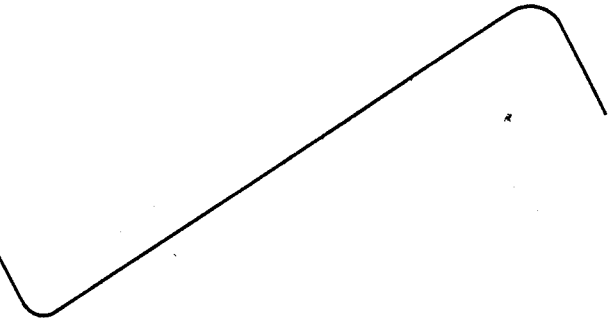
FIG. 4B

METHOD FOR DRIVING A LIGHT SCANNING APPARATUS

This invention relates to a method for driving a light scanning apparatus which can be used for a laser scanner or similar devices.

The known rotating multi-facet type light scanning apparatus is provided with, for example, a hexa-facet rotating mirror having six plane mirror surfaces. The hexa-facet rotating mirror will scan an object six times during each revolution. During its rotation, each mirror surface will sweep a reflected light over a predetermined angle (hereinafter called "deflection angle"). If the mirror is rotated at a high speed, the apparatus can achieve a high speed scanning. If the apertures of mirror surfaces are made large, the scanning light spot will concentrate its energy into a scanned area and achieve a proportionally high resolving power. However, to achieve an equal special resolving power over a large deflection angle all mirror surfaces should be made exactly plane, and also each mirror surfaces should be parallel. Otherwise, they would fail to sweep the reflected light over the same deflection angle and would fail to project the reflected light to the same region of an object. To provide such mirror surfaces, much labor and time are required. Consequently, a light scanning apparatus using a multifacet mirror is inevitably very expensive.

The known acousto-optic light deflector is provided with, for example, a transducer which is secured to one end of an acousto-optic crystal, e.g. lithium niobate (LiNbO$_3$). As ultrasonic waves propagate through the crystal, the refractive index of the crystal periodically changes, and the crystal therefore works as a diffraction lattice to light which travels in a direction perpendicular to the ultrasonic waves propagating direction. The pitch of the diffraction lattice is varied according to the frequency of the ultrasonic waves, whereby the light is diffracted by the crystal at a different angle. Thus, as the frequency of the ultrasonic waves is gradually varied, the crystal sweeps output light over a specific deflection angle. The acousto-optic light deflector helps achieve a high speed scanning, too, but the light scanning thus achieved cannot provide a high resolution. In addition, the acousto-optic light deflector of this type is relatively expensive.

The known light scanning apparatus using an oscillatory mirror can be manufactured at a low cost. Two types of oscillatory mirrors scanners are known. One is a resonance type which vibrates at a constant frequency in response to near a resonance frequency of the scanner. The other is a galvano mirror type which vibrates in a specific manner according to the waveforms of drive signals. The light scanning apparatus using a resonance type oscillatory mirror can achieve a high speed scanning, but it cannot carry out a satisfactory constant speed scanning because the mirror vibrates in such a way that the relationship between time and deflection angle is represented as a sinusoidal wave. A constant speed scanning for signal detector or data recording is only possible for a period during which the relationship between time and deflection angle is represented as a straight line. The scanning efficiency with respect to time (i.e. a constant speed scanning period/one-cycle scanning period) is thus low. To compensate for such a low scanning efficiency it is necessary to use signals having frequencies over a broad range so that they may be processed during the limited effective scanning period. Consequently, the light scanning apparatus using a resonance type oscillatory mirror must be provided with a high speed light detector and a high speed light modulator. The effectiveness of a resonance type oscillatory mirror is therefore much limited; it is used only in a device such as a bar code reader which does not always require a constant speed scanning.

A light scanning apparatus using a galvano mirror can carry out scanning which corresponds exactly to the waveform of a drive signal. If a sawtooth drive signal is used, it can effect a highly efficient scanning at a constant speed and can therefore be employed in a scanner for detecting signals, a recording apparatus, a retrieval apparatus and the like. The light scanning apparatus using a galvano mirror, however, cannot scan an object at a high speed. This is because the movement of the galvano mirror fails to follow the drive signal when the frequency of the drive signal is higher than a specific value. If the frequency of the drive signal is too high, the transient vibration of the mirror during a swing back period will be superposed the next scanning cycle, whereby the light scanning apparatus fails to scan the object at a constant speed. A constant scanning speed is possible only when the ratio between the frequency of drive signal and the resonant frequency of the apparatus is of a proper value. Thus, the apparatus having a galvano mirror can achieve scanning at a constant speed even if the drive signal has a high frequency, provided that the resonant frequency of the apparatus is proportionally high. For instance, a technical data published by General Scanning, Inc., U.S.A. shows that a light scanning apparatus using a galvano mirror can effect a constant speed scanning in response to a sawtooth drive signal if the frequency of the drive signal is less than 35% of the resonant frequency of the galvano mirror.

Accordingly, it is preferred that the light scanning apparatus should have as high a resonant frequency as possible. However, the resonant frequency of the apparatus is limited if the scanning is to accomplish a specific resolving power, which is given by the following equation.

$$N = \frac{D\theta}{A\lambda}$$

($D$: aperture width,
$\theta$: diffraction angle,
$A$: constant,
$\lambda$: wave length)

High resolving power may be achieved with its $D$ and $\theta$. But large values of $D$ and $\theta$ are mutually contradictory. Generally the resolving power depends upon the wave length of the light used, the deflection angle and the thickness of the light flux used. If light of a specific wave length is used, the resolving power is proportional to the deflection angle and the thickness of the light flux. The resolving power increases in proportion to the thickness of the light flux because the light spots on the scanning region of an object become smaller by diffraction of light.

However, if the deflection angle is large, the scanning time will become proportionally long. To provide a thick light flux, a large galvano mirror should be used, thus increasing the load of the apparatus. If both the deflection angle and the galvano surface are made large, the resonant frequency of the light scanning apparatus will be lowered to result a slow scanning response.

The resolving power generally demanded in facsimile and recording apparatus is 2,000 to 3,000 light spots. The maximum resonant frequency of a light scanning apparatus using a galvano mirror, which exhibits resolving power of 2,000 to 3,000 light spots, is 500 to 1,000 Hz. The maximum frequency of a sawtooth signal to drive such a light scanning apparatus is only 35% of the maximum resonant frequency of the apparatus, i.e. 150 to 350 Hz.

An object of this invention is to provide a method for driving a light scanning apparatus so that the apparatus scans an object with light at a frequency nearly equal to its resonant frequency and at a constant speed.

According to the invention there is provided a method for driving a light scanning apparatus which scans an object with light in accordance with a voltage signal supplied to drive means, said method comprising: a first step of supplying a voltage signal of a first predetermined level to said drive means; a second step of supplying a voltage signal of a second predetermined level to said drive means; a third step of supplying a voltage signal of a third predetermined level to said drive means; and a fourth step of supplying a voltage signal of a fourth predetermined level to said drive means, said first to fourth steps being repeated in this order, said first level being between said second and third levels, and said fourth level being between said first and second levels.

This invention can be more fully understood from the following detailed description when taken in conjunction with the accompanying drawings, in which:

FIG. 3 is a circuit diagram of a drive signal generator of the galvano mirror used in the laser printer of FIG. 1;

FIG. 4A shows a waveform of a drive signal generated by the generator of FIG. 3;

FIG. 4B illustrates how the galvano mirror vibrates when supplied with the drive signal shown in FIG. 4A;

Now referring to the accompanying drawings an embodiment of the invention will be described.

Figure 1:
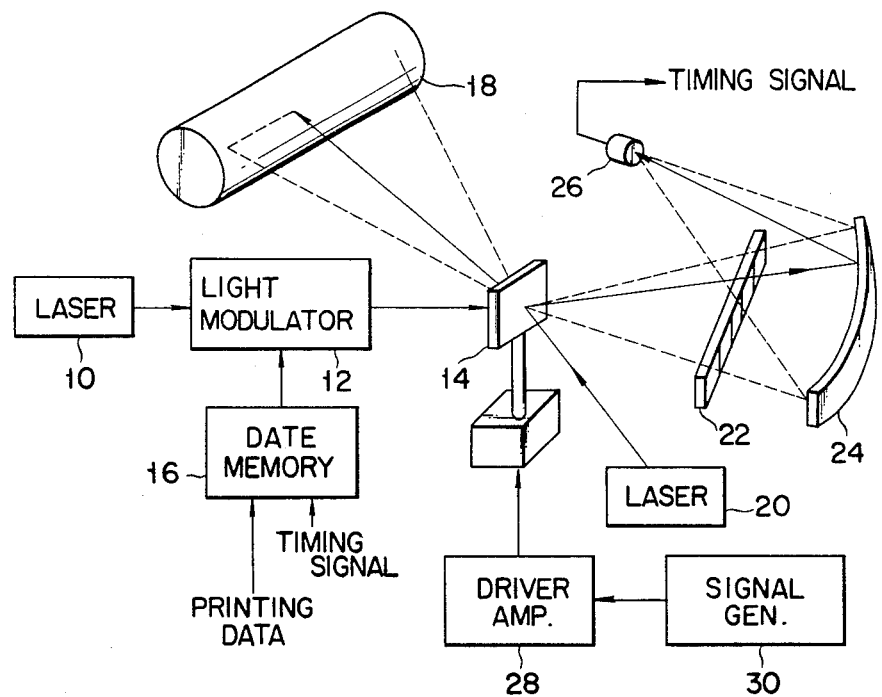
FIG. 1 is a diagram schematically showing a laser printer provided with a light scanning apparatus.

FIG. 1 schematically shows a laser printer using a light scanning apparatus. A laser beam is emitted from a laser source 10 through a light modulator 12 onto a front mirror surface of a galvano mirror 14. The light modulator 12 modulates the laser beam according to print instruction signals from a data memory 16, which represent the printing data stored in the memory 16. The laser beam thus modulated is then applied onto the galvano mirror 14. The data memory 16 supplies the print instruction signals to the light modulator 12 when it receives a timing signal, which shall be later described. The laser beam is reflected by the galvano mirror 14, propagates through a recording optical system (not shown) and is recorded on a recording medium 18 as an optical image.

A laser beam is emitted from an auxiliary laser source 20 onto a rear mirror surface of the galvano mirror 14. The laser beam is reflected by the mirror 14 and propagates via a scale 22 and a reflector 24 to a light detector 26. The scale 22 is made mainly of an opaque material and has a transparent portions which are arranged equidistantly in the scanning direction. The light detector 26 therefore detects laser beams at regular intervals so long as the scanning is conducted at a constant speed. When the scanning is carried out at a varying speed, the detector 26 detects laser beams at irregular intervals and thus detects how the scanning speed is varying. The detector 26 produces an output signal every time it detects a laser beam. Thus, the output signals of the light detector 26 may be used as the above-mentioned timing signals. In this case, the printing data stored in the memory 16 can be recorded on the recording medium 18 in synchronism with the light scanning.

Figure 2:
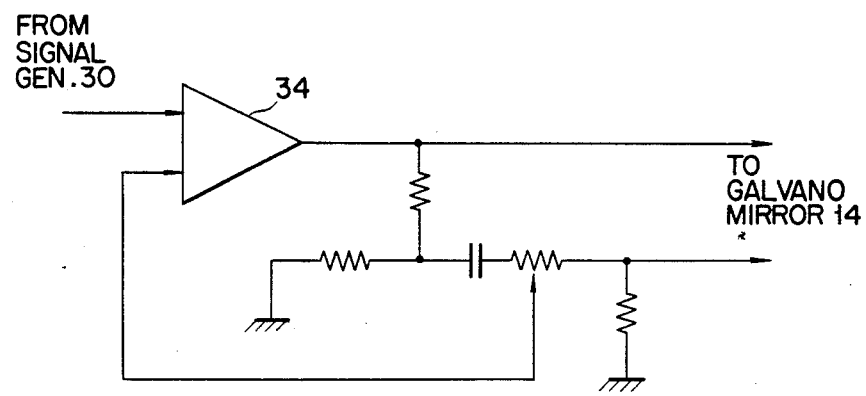
FIG. 2 is a circuit diagram of a drive voltage amplifier of a galvano mirror used in the laser printer of FIG. 1.

To vibrate the galvano mirror 14, drive voltage signals are supplied to the mirror 14 from a drive signal generator 30 through a driver amplifier 28 which is constructed as shown in FIG. 2. The drive voltage signals are supplied to an amplifier 34. The output of the amplifier 34 is supplied to the galvano mirror 14, and the output current of the amplifier 34 is fed back to the input thereof. The movement of the mirror 14 can therefore accurately follow the drive voltage signals.

Now referring to FIGS. 3 to 4B, the drive signal generator 30 will be described more in detail and a method of driving the galvano mirror 14 will be described, too. The galvano mirror 14 has a resonant frequency of, for example, 450 Hz. A clock pulse generator 36 generates clock pulses of 366 Hz. These clock pulses are supplied to a set terminal of a flip-flop 44 through a monostable multi-vibrator 38, a monostable multi-vibrator 40 and a monostable multi-vibrator 42. They are supplied also to a reset terminal of the flip-flop 44 directly from the clock pulse generator 36. The generator 30 further comprises constant power sources 46, 48, 50 and 52 which produce −3 V, 3 V, −10 V and 2 V signals, respectively. The constant power sources 46, 48, 50 and 52 are connected to the driver amplifier 28 through switching elements 54, 56, 58 and 60, respectively.

The switching elements 54, 56, 58 and 60 receive at their control terminals the output signal of the multi-vibrator 38, the output of the multi-vibrator 40, the output signal of the multi-vibrator 42 and the output signal of the flip-flop 44, respectively. When its input signal level falls, the multi-vibrator 38 produces an output signal which lasts for a period T1. Similarly, when their input signal levels fall, the multi-vibrators 40 and 42 produce an output signal which lasts for a period T2 and an output signal which lasts for a period T3, respectively. Here, T1=0.60 ms, T2=1.31 ms and T3=0.33 ms. The flip-flop 44 operates when its input signal level falls. When the clock pulse generator 36 generates a clock pulse, the flip-flop 44 is reset. It is set 2.24 ms (T1+T2+T3) later when the output signal level of the multi-vibrator 42 falls. It is reset again when the clock pulse generator 36 generates a next clock pulse. Since the clock pulse is a 366 Hz pulse, its duration T4 is 0.49 ms. Thus, the switching elements 54, 56, 58 and 60 are successively rendered conductive for 0.60 ms, 1.31 ms, 0.33 ms and 0.49 ms, respectively after a clock pulse has been generated. As a result, the driver amplifier 28 is supplied with a voltage signal of such a waveform as shown in FIG. 4A while a clock pulse lasts. At the amplifier 28 a current is fed back to the voltage signal. Driven by the output voltage of the amplifier 28, the galvano mirror 14 vibrates as shown by a bending line of FIG. 4B.

As mentioned above, the duration of a drive signal is divided into four periods, and the drive signal is made to have four different levels during the four periods, respectively. This method makes it possible to vibrate a galvano mirror at a frequency as high as about 80% of the resonant frequency of the galvano mirror. The method can drive a light scanning apparatus using a galvano mirror so that the apparatus scans an object with light at a high and constant speed.

Figure 5:
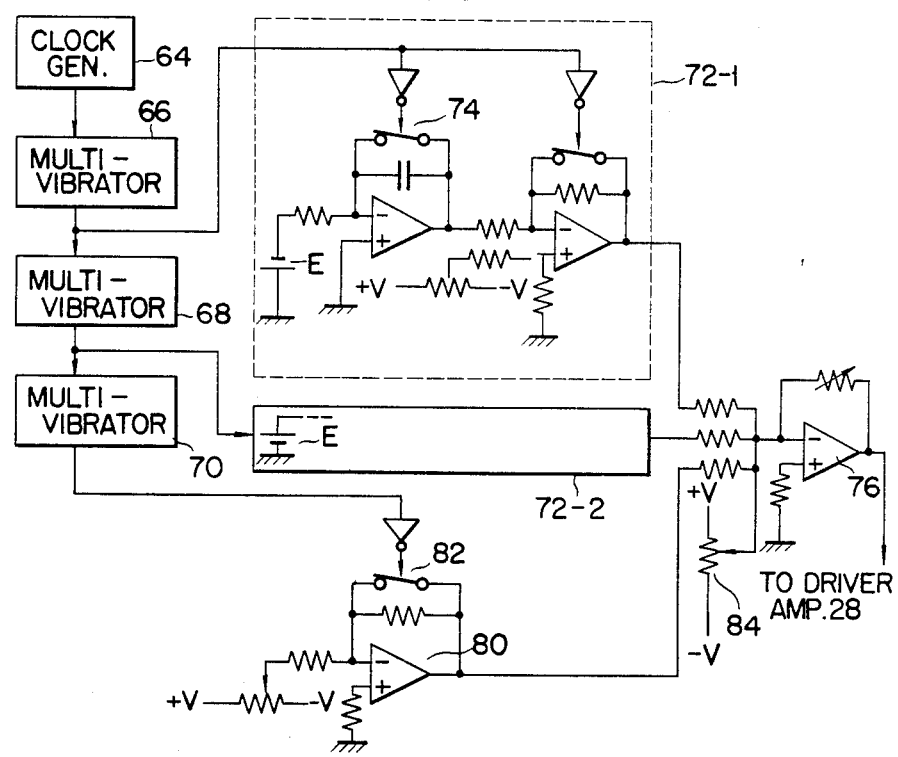
FIG. 5 is a circuit diagram of another drive signal generator.

Now referring to FIGS. 5 to 6B, another method according to this invention will be described. FIG. 5 shows another signal generator 30, wherein an output clock pulse of a clock pulse generator 64 is supplied to a monostable multi-vibrator 70 through two monostable multi-vibrators 66 and 68. When their input signal levels fall, the multi-vibrators 66, 68 and 70 produce an output signal which lasts for a period T1, an output signal which lasts for a period T2 and an output signal which lasts for a period T3, respectively. The sum of these periods T1, T2 and T3 is shorter than the duration of the clock pulse from the clock pulse generator 64. The outputs of the multi-vibrators 66 and 68 are supplied to integration circuits 72-1 and 72-2, respectively. The circuits 72-1 and 72-2 are identical, except that their power source E are of the opposite polarities. Upon receipt of an output signal of the multi-vibrator 66, integration switches 74 open, whereby the integration circuits 72-1 and 72-2 start operating. The outputs of the circuits 72-1 and 72-2 are supplied to a driver amplifier 28 through an amplifier 76. The output of the integration circuit 72-1 is a voltage signal whose level gradually falls and which lasts for the period T1 from the generation of a clock pulse. The output of the integration circuit 72-2 is a voltage signal whose level gradually rises and which lasts for the period T2 from elapse of said period T1. Upon elapse of the period T2, the multi-vibrator 70 starts supplying a control switch 82 of a constant power source 80 with its output signal which lasts for the period T3. While the output signal of the multi-vibrator 70 is being supplied to the control switch 82, the constant power source 80 keeps producing a voltage signal of a constant level, which is lower than the average level of the gradually falling voltage signal which the integration circuit 72-1 produces. This constant voltage signal is supplied also to the driver amplifier 28 through the amplifier 76. Further, an output voltage of another constant voltage source 84 is applied to the driver amplifier 28 through the amplifier 76. The output voltage of the constant voltage source 84 is lower than the average output voltage of the integration circuit 72-2 and higher than the output voltage of the constant voltage source 80. As a result, the driver amplifier 28 receives a voltage signal having such a waveform as shown in FIG. 6A while a clock pulse lasts.

Figure 6A:
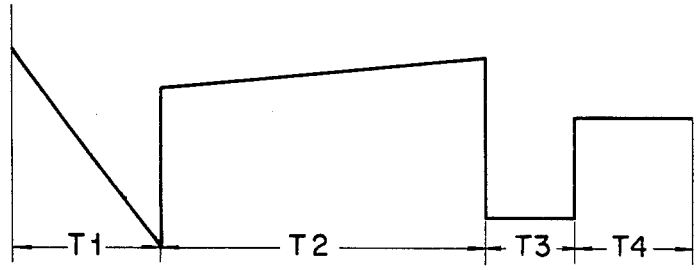
FIG. 6A shows a waveform of a drive signal generated by the generator of FIG. 5.
Figure 6B:
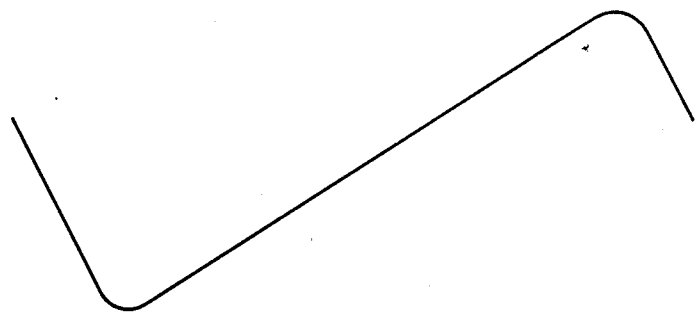
FIG. 6B illustrates how the galvano mirror vibrates when supplied with the drive signal shown in FIG. 6A.

In response to such a drive voltage signal as shown in FIG. 6A, a galvano mirror 14 vibrates to achieve a highly efficient scanning at a high and constant speed as indicated in FIG. 6B. This method can drive the galvano mirror 14 effectively even if use is made of clock pulses the frequency of which is nearly equal to the resonant frequency of the galvano mirror 14. To prove this, a light scanning apparatus of the structure shown in FIG. 1 having a signal generator of FIG. 5 was manufactured, using a galvano mirror with a resonant frequency of 1,000 Hz. Then, drive voltage signals of various frequencies were generated by the voltage generator, using clock pulses of various frequencies, and were supplied to the galvano mirror. The results were as illustrated in FIG. 7.

Figure 7:
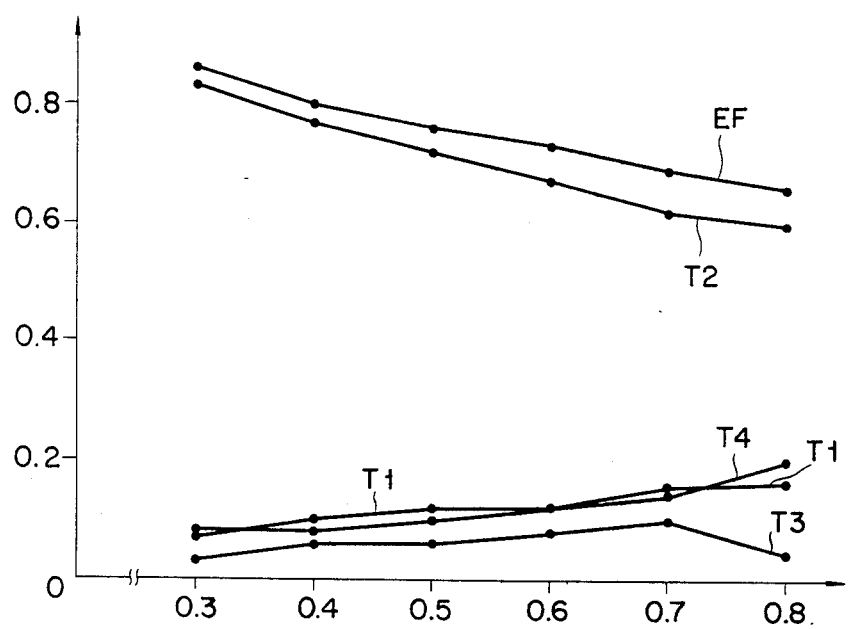
FIG. 7 is a graph showing the efficiency of the scanning achieved by the galvano mirror when the mirror vibrates as shown in FIG. 6B.

In FIG. 7, the ratio of the frequency f of a drive voltage signal to the resonant frequency $f_o$ (i.e. 1,000 Hz) of the galvano mirror is plotted on X axis, and the scanning efficiency EF (i.e. period of scanning at a constant speed/one-cycle scanning period) is plotted on Y axis. Also plotted on Y axis are the ratio of period T1 to the one-cycle scanning period, the ratio of period T2 to the one-cycle scanning period, the ratio of period T3 to the one-cycle scanning period, and the ratio of period T4 to the one-cycle scanning period.

As FIG. 7 shows, the scanning efficiency was as high as 70% when the galvano mirror was driven by a drive voltage signal the frequency of which was 80% of the resonant frequency of the mirror. Here it should be noted that the voltage signal whose level gradually rises during period T2 does not solely improve the linearity of the sawtooth curve shown in FIG. 6B. The voltage signal and the other voltage signals, which continue during periods T1, T3 and T4, are equally effective in enhancing the linearity of the sawtooth curve.

Figure 8A:
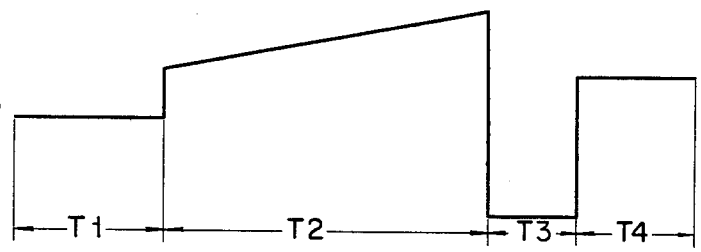
FIG. 8A shows a waveform of another drive signal.
Figure 8B:
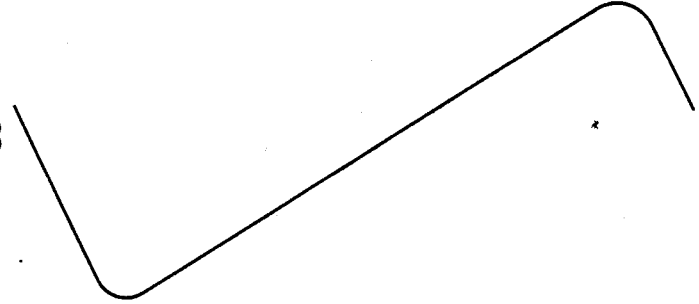
FIG. 8B illustrates how the galvano mirror vibrates when supplied with the drive signal of FIG. 8A.

The drive voltage signal may have such a waveform as shown in FIG. 8A, instead of the waveform which is shown in FIG. 4A or 6A. This drive voltage signal is generated by the cooperation of the drive signal generators which are shown in FIG. 3 and FIG. 5, respectively. Roughly speaking, the drive voltage signal has a waveform similar to that of the drive signal shown in FIG. 4A. It differs only in that its level gradually rises during period T2. The average level during period T2 is higher than the constant level during period T4, which in turn is higher than the constant level during period T3. The drive voltage signal of FIG. 8A drives the galvano mirror 14 in such a manner as shown in FIG. 8B. That is, as FIG. 8B shows, the drive voltage signal makes the mirror 14 achieve an efficient light scanning which is represented also by a sawtooth curve having a good linearity. To prove this, a light scanning apparatus of the structure shown in FIG. 1 having a signal generator which is a combination of the signal generators shown in FIGS. 3 and 5 was manufactured, using a galvano mirror with a resonant frequency of 1,000 Hz. Then, drive voltage signals of various frequencies were generated by the signal generator, using clock pulses of various frequencies, and were supplied to the galvano mirror. The results were as illustrated in FIG. 9.

Figure 9:
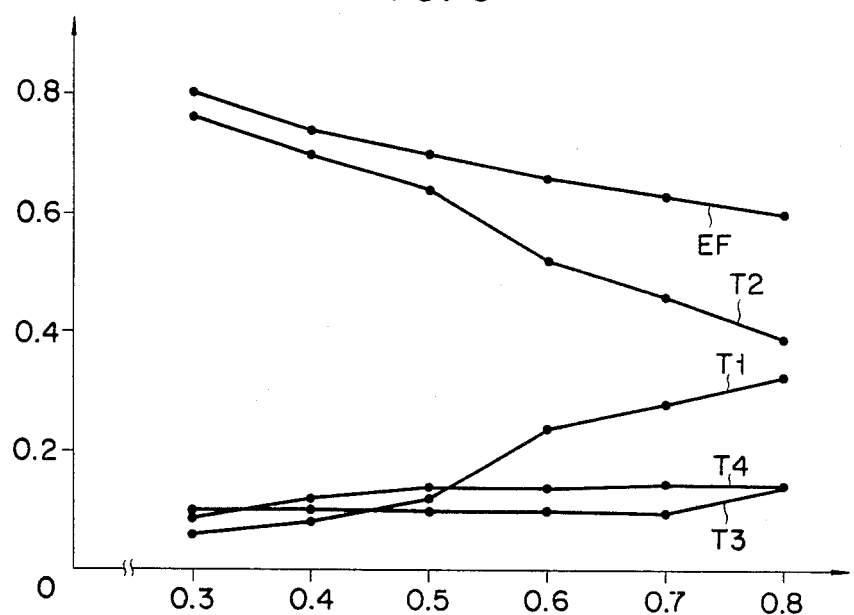
FIG. 9 is a graph showing the efficiency of the scanning achieved by the galvano mirror when the mirror vibrates as shown in FIG. 8B.

In FIG. 9, the ratio of the frequency f of the drive voltage signal to the resonant frequency $f_o$ (i.e. 1,000 Hz) of the galvano mirror is plotted on X axis, and the scanning efficiency EF (i.e. period of scanning at a constant speed/one-cycle scanning period) is plotted on Y axis. Also plotted on Y axis are the ratio of period T1 to the one-cycle scanning period, the ratio of period T2 to the one-cycle scanning period, the ratio of period T3 to the one-cycle scanning period, and the ratio of period T4 to the one-cycle scanning period.

As FIG. 9 shows, the scanning efficiency was as high as 60% when the galvano mirror was driven by a drive voltage signal the frequency of which was 80% of the resonant frequency of the mirror.

Figure 10A:
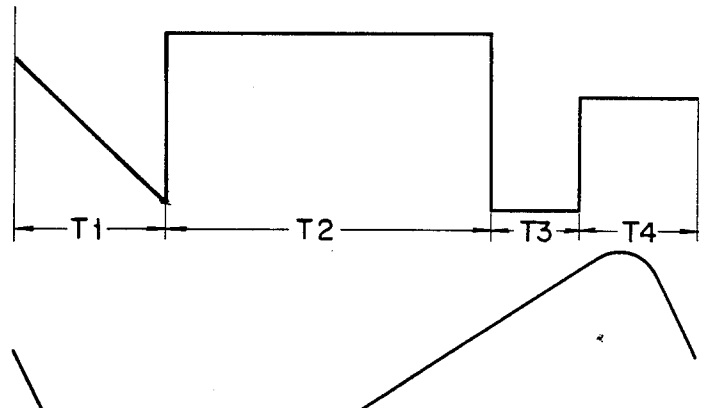
FIG. 10A shows a voltage waveform of still another drive voltage.
Figure 10B:
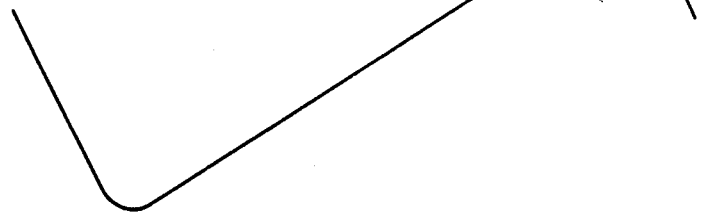
FIG. 10B illustrates how the galvano mirror vibrates when supplied with the drive voltage of FIG. 10A.

Instead, the drive voltage signal may have such a waveform as shown in FIG. 10A. This drive voltage signal may be generated in the same way as the drive voltage signal of FIG. 4A. It differs from the signal of FIG. 4A only in that its level during period T1 gradually falls. The drive voltage signal makes the mirror 14 achieve an efficient light scanning which is represented also by a sawtooth curve having a good linearity as illustrated in FIG. 10B.

As FIGS. 7 and 9 show, a higher scanning efficiency was obtained when the level of the voltage signal fell gradually during period T1 than when the level remained unchanged during period T1.

As mentioned above, the method according to this invention drives a light scanning apparatus having a galvano mirror so that the apparatus can scan an object with light at a constant speed even if the mirror is driven by a drive voltage signal whose frequency is more than 35% of the resonant frequency of the mirror.

This invention is not limited to what has been described above. For example, the drive voltage signal may have its level irregularly changed at a transient moment between periods T1 and T2, between periods T2 and T3 or between periods T3 and T4. It may be formed by combining two or more voltage signals having curving waveforms and may have a substantially constant level or a gradually rising or falling level. Further, drive voltage signals which are obtained by turning the waveforms of FIGS. 6A, 8A and 10A upside down may be used to drive a galvano mirror. In this case, the galvano mirror sweeps a beam of light in the opposite direction and can scan an object at a constant speed.

Figure 11:
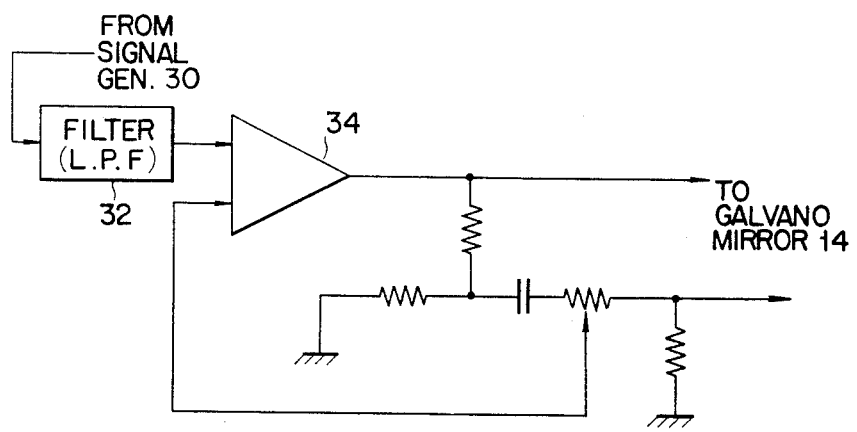
FIG. 11 is a circuit diagram of another drive signal generator of the galvano mirror used in the laser printer of FIG. 1.

Moreover, instead of the driver amplifier shown in FIG. 2, use may be made of such a driver amplifier as illustrated in FIG. 11. The drive voltage signals from the drive voltage generator 30 are supplied to an amplifier 34 via a lowpass filter 32 which remove frequency components of each drive voltage signal, the frequencies of which are more than thrice the resonant frequency of the galvano mirror. Practically the galvano mirror 14 cannot vibrate at a frequency higher than the resonant frequency. Thus, the mirror 14 vibrates more stably if extra frequency components are removed from the drive voltage signals by the lowpass filter 32.

What we claim is:

1. A method for driving a light scanning apparatus which scans an object with light in accordance with voltage signals supplied to drive means, said method comprising:
   a first step of supplying a voltage signal of a first predetermined level to said drive means;
   a second step of supplying a voltage signal of a second predetermined level to said drive means;
   a third step of supplying a voltage signal of a third predetermined level to said drive means; and
   a fourth step of supplying a voltage signal of a fourth predetermined level to said drive means,
   said first to fourth steps being repeated in this order, said first level being between said second and third levels, and said fourth level being between said first and second levels.

2. The method according to claim 1, wherein said first to fourth steps are successively repeated at a frequency higher than half the resonant frequency of said light scanning apparatus.

3. The method according to claim 1, wherein each of said voltage signals is supplied to said drive means through a lowpass filter which permits signals having a frequency lower than the resonant frequency of said apparatus to pass through it.

4. A method for driving a light scanning apparatus which scans an object with light in accordance with voltage signals supplied to drive means, said method comprising:
   a first step of supplying said drive means with a first voltage signal the level of which gradually changes;
   a second step of supplying said drive means with a voltage signal of a first predetermined level;
   a third step of supplying said drive means with a voltage signal of a second predetermined level; and
   a fourth step of supplying said drive means with a voltage signal of a third predetermined level,
   said first to fourth steps being repeated in this order, the level of said first voltage signal changing toward said second level and the average level thereof being between said first and second levels, and said third level being between said first level and the average level of said first voltage signal.

5. The method according to claim 4, wherein said first to fourth steps are successively repeated at a frequency higher than half the resonant frequency of said light scanning apparatus.

6. The method according to claim 4, wherein each of said voltage signals is supplied to said drive means through a lowpass filter which permits signals having a frequency lower than the resonant frequency of said apparatus to pass through it.

7. A method for driving a light scanning apparatus which scans an object with light in accordance with voltage signals supplied to drive means, said method comprising:
   a first step of supplying said drive means with a voltage signal of a first predetermined level;
   a second step of supplying said drive means with a second voltage signal the level of which gradually changes;
   a third step of supplying said drive means with a voltage signal of a second predetermined level; and
   a fourth step of supplying said drive means with a voltage signal of a third predetermined level,
   said first to fourth steps being repeated in this order, said first level being between said second level and the average level of said second voltage signal, the level of said second voltage signal changing away from said first level, and said third level being between said first level and the average level of said second voltage signal.

8. The method according to claim 7, wherein said first to fourth steps are successively repeated at a frequency higher than half the resonant frequency of said light scanning apparatus.

9. The method according to claim 7, wherein each of said voltage signals is supplied to said drive means through a lowpass filter which permits signals having a frequency lower than the resonant frequency of said apparatus to pass through it.

10. A method for driving a light scanning apparatus which scans an object with light in accordance with voltage signals supplied to drive means, said method comprising:
- a first step of supplying said drive means with a first voltage signal the level of which gradually changes in a first direction;
- a second step of supplying said drive means with a second voltage signal the level of which gradually changes in a second direction;
- a third step of supplying said drive means with a voltage signal of a first predetermined level; and
- a fourth step of supplying said drive means with a voltage signal of a second predetermined level, said first to fourth steps being repeated in this order, the average level of said first voltage signal being between said first level and the average level of said second voltage signal, and said second level being between the average levels of said first and second voltage signals.

11. The method according to claim 10, wherein said first to fourth steps are successively repeated at a frequency higher than half the resonant frequency of said light scanning apparatus.

12. The method according to claim 10, wherein each of said voltage signals is supplied to said drive means through a lowpass filter which permits signals having a frequency lower than the resonant frequency of said apparatus to pass through it.

* * * * *

UNITED STATES PATENT AND TRADEMARK OFFICE
CERTIFICATE OF CORRECTION

PATENT NO. : 4,329,011
DATED : May 11, 1982
INVENTOR(S) : Masafumi Mori et. al.

It is certified that error appears in the above—identified patent and that said Letters Patent is hereby corrected as shown below:

Please insert the following:

[30] -- Foreign Application Priority Data

Nov. 30, 1978 [JP] Japan......147270 --

Signed and Sealed this

Thirteenth Day of July 1982

[SEAL]

Attest:

GERALD J. MOSSINGHOFF

Attesting Officer      Commissioner of Patents and Trademarks